United States Patent
Sakaguchi et al.

[11] Patent Number: 6,027,560
[45] Date of Patent: Feb. 22, 2000

[54] METHOD FOR PRODUCING CRYSTALLINE, INORGANIC ION EXCHANGE MATERIAL

[75] Inventors: Mikio Sakaguchi; Ichiro Sakamoto; Taisuke Aosaki; Kazuhiro Otsuka, all of Wakayama, Japan

[73] Assignee: Kao Corporation, Tokyo, Japan

[21] Appl. No.: 08/913,634

[22] PCT Filed: Apr. 4, 1996

[86] PCT No.: PCT/JP96/00950

§ 371 Date: Sep. 19, 1997

§ 102(e) Date: Sep. 19, 1997

[87] PCT Pub. No.: WO96/33131

PCT Pub. Date: Oct. 24, 1996

[30] Foreign Application Priority Data

Apr. 18, 1995 [JP] Japan .................................. 7-117932

[51] Int. Cl.[7] .................................................. C04B 12/04
[52] U.S. Cl. .......................................... 106/600; 423/332
[58] Field of Search .............................. 423/332; 106/600

[56] References Cited

FOREIGN PATENT DOCUMENTS

| 0550048 A1 | 12/1992 | European Pat. Off. . |
|---|---|---|
| 0630855 A3 | 6/1994 | European Pat. Off. . |
| 96 01307 | 1/1996 | WIPO . |

*Primary Examiner*—Paul Marcantoni
*Attorney, Agent, or Firm*—Birch, Stewart, Kolasch & Birch, LLP

[57] ABSTRACT

The method for producing a crystalline, inorganic ion exchange material having the following composition: $xM_2O \cdot ySiO_2 \cdot zMeO$, wherein x, y and z are numerical values satisfying the relationships of $y/x=0.5$ to 2.1, preferably 0.5 to 2.0, and $z/y=0.001$ to 1.0; M stands for Na and K, wherein K/Na is in the range from 0.01 to 1.2; and Me stands for Ca and/or Mg, the method including the steps of adding 1 to 85 parts by weight of water to 100 parts by weight of cullets, wherein the cullets have the following compositon: $xM_2O \cdot ySiO_2 \cdot zMeO$, wherein x, y, z, M, and Me are defined as above, and then baking the resulting mixture.

11 Claims, 1 Drawing Sheet

METHOD FOR PRODUCING CRYSTALLINE, INORGANIC ION EXCHANGE MATERIAL

TECHNICAL FIELD

The present invention relates to a method for producing a crystalline, inorganic ion exchange material, specifically silicate builders, useful for ion exchangers and alkalizers.

BACKGROUND ART

Since silicate ion exchange materials have alkaline buffering properties, they are highly useful for detergent builders. Particularly, since the silicate ion exchange materials in crystalline forms have excellent cationic exchange capacities, they are particularly useful for detergent builders.

Among the methods for producing silicate builders, Japanese Examined Patent Publication No. 5-66888 discloses a method using water glass as a starting material. In this method, a crystalline sodium-silicate having a layered structure is produced by a method comprising the steps of spray-drying a water glass solution to form amorphous sodium silicate, and heating the resulting sodium silicate in a firing zone while recirculating a portion of the product. However, this method requires drying off large amounts of the water content from the water glass, which makes it disadvantageous from an energy-saving viewpoint.

Japanese Examined Patent Publication No. 6-72008 discloses a method for directly baking the glassy product to solve the above problems. In this method, crystalline sodium silicate is produced by the steps of pulverizing a water glass product obtainable by cooling a fused mixture of sand and soda, and then heating the pulverized product. However, in this method, since the resulting product comprises a two-component system of $Na_2O$—$SiO_2$, the control of the crystalline system becomes difficult, rendering the method unsatisfactory for ion exchange materials for detergents.

DISCLOSURE OF THE INVENTION

In view of the above problems, an object of the present invention is to provide a method for easily producing high-performance silicate ion exchange material using cullets which are easy to handle as starting materials.

This object is achieved by a specific method for producing an ion exchange material.

Specifically, the gist of the present invention is as follows:

(1) A method for producing a crystalline, inorganic ion exchange material having the following composition:

$$xM_2 \cdot ySiO_2 \cdot zMeO,$$

wherein x, y, and z are numerical values satisfying the relationships of y/x=0.5 to 2.1, preferably 0.5 to 2.0, and z/y=0.001 to 1.0; M stands for Na and K, wherein K/Na is in the range from 0.01 to 1.2; and Me stands for Ca and/or Mg, the method comprising the steps of adding 1 to 85 parts by weight of water to 100 parts by weight of cullets, wherein the cullets have the following composition:

$$xM_2O \cdot ySiO_2 \cdot zMeO,$$

wherein x, y, z, M, and Me are defined as above, and then baking the resulting mixture;

(2) A method for producing a crystalline, inorganic ion exchange material having the following composition:

$$xM_2O \cdot ySiO_2,$$

wherein x and y are numerical values satisfying the relationship of y/x=0.5 to 2.1, preferably 0.5 to 2.0; and M stands for Na and K, wherein K/Na is in the range from 0.01 to 1.2, the method comprising the steps of adding 1 to 75 parts by weight of water to 100 parts by weight of cullets, wherein the cullets have the following composition:

$$xM_2O \cdot ySiO_2,$$

wherein x, y, and M are defined as above, and then baking the resulting mixture;

(3) The method described in item (1) above, wherein the cullets are prepared by fusing a mixture comprising silica sand, an alkali metal compound, and an alkaline earth metal compound at a fusing temperature of from 900 to 1500° C., and the baking temperature after adding water to the cullets is from 500 to 1300° C.;

(4) The method described in item (2) above, wherein the cullets are prepared by fusing a mixture comprising silica sand and an alkali metal compound at a fusing temperature of from 900 to 1500° C., and the baking temperature after adding water to the cullets is from 500 to 1300° C.;

(5) The method described in item (3) or item (4) above, wherein the alkali metal compound is selected from the group consisting of potassium hydroxide, sodium hydroxide, potassium carbonate, sodium carbonate, potassium sulfate, and sodium sulfate; and (6) The method described in item (3) above, wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, magnesium chloride, calcium sulfate, magnesium sulfate, and double salts thereof.

BEST MODE FOR CARRYING OUT THE INVENTION

Figure 1:
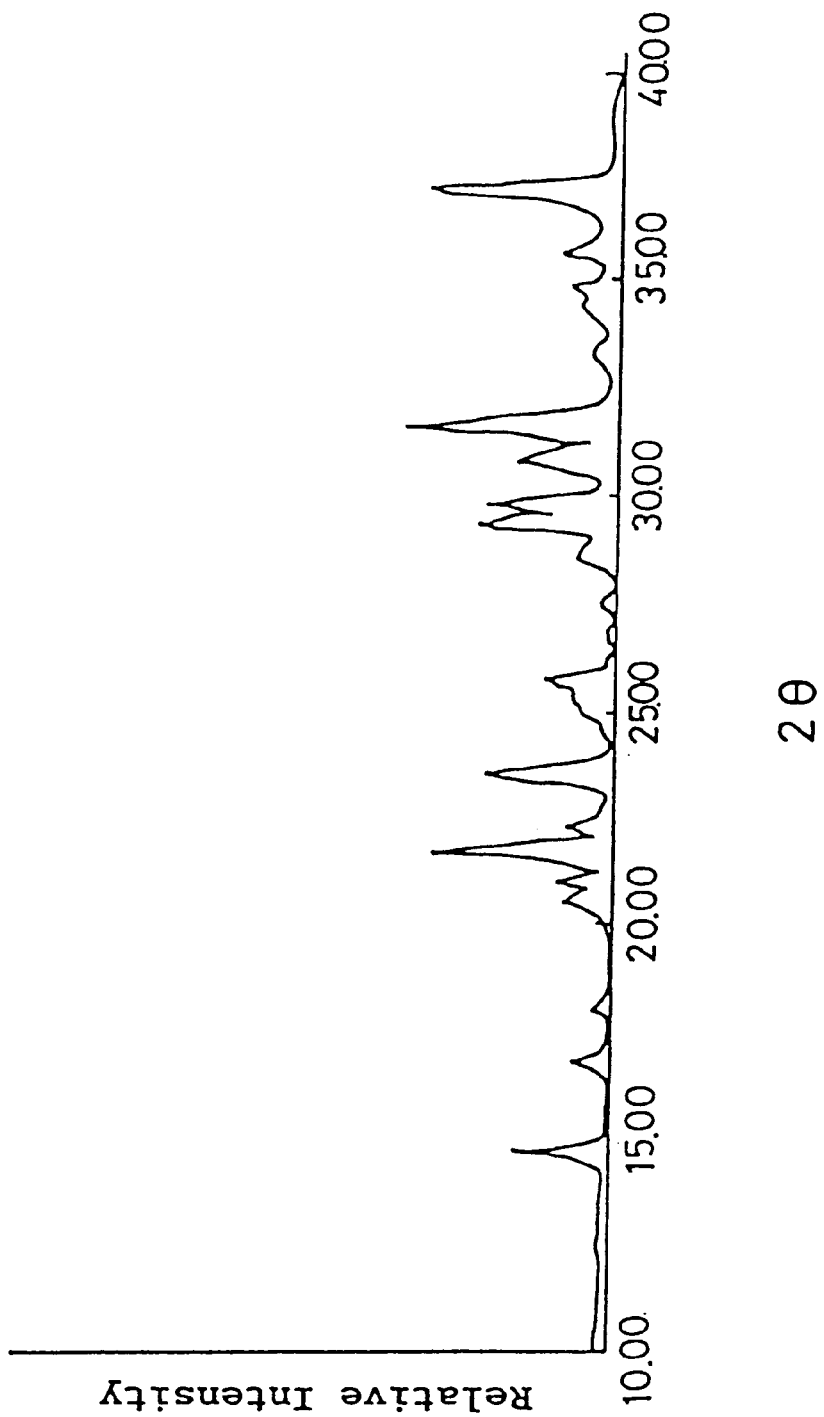
FIG. 1 is a graph showing an X-ray diffraction pattern of an inorganic ion exchange material powder obtained in Example 1.

The method for producing a crystalline, inorganic ion exchange material having a particular composition comprises the steps of adding 1 to 85 parts by weight or 1 to 75 parts by weight of water to 100 parts by weight of cullets having a particular composition, and then baking the resulting mixture.

In other words, the method is characterized by the incorporation of alkali metals and alkaline earth metals into the above cullets and by the limitation to specific preparation conditions of the starting materials for baking. In the present invention, alkaline earth metals and potassium are essential in the first embodiment, and only potassium is essential in the second embodiment. The methods of the present invention will be explained in detail below.

The cullets in the present invention refer to granulated products of alkali silicate glass having the following compositions and which are obtainable by fusing methods.

First Embodiment

The cullets have the following composition:

$$xM_2O \cdot ySiO_2 \cdot zMeO,$$

wherein x, y, and z are numerical values satisfying the relationships of y/x=0.5 to 2.1 and z/y=0.001 to 1.0; M stands for Na and K, wherein K/Na is in the range from 0.01 to 1.2; and Me stands for Ca and/or Mg.

In the first embodiment, a preference is given to those satisfying the relationships of y/x=0.5 to 2.0, more preferably 1.0 to 2.0, z/y=0.005 to 0.5, and K/Na=0.01 to 0.9.

Second Embodiment

The cullets have the following composition:

$$xM_2O.ySiO_2,$$

wherein x and y are numerical values satisfying the relationship of y/x=0.5 to 2.1; and M stands for Na and K, wherein K/Na is in the range from 0.01 to 1.2.

In the second embodiment, a preference is given to those satisfying the relationships of y/x=0.5 to 2.0, more preferably 1.0 to 2.0, and K/Na=0.01 to 0.8.

The usable cullets in the present invention are not particularly limited, as long as they satisfy the above definitions, including cullets obtainable by fusing compounds containing various elements. Among them, because of their uniform compositions, a preference is given to cullets prepared at a fusing temperature of from 900 to 1500° C.

Specifically, these cullets are produced by fusing a mixture of silica sand, sodium carbonate, potassium carbonate, and optionally calcium carbonate and/or magnesium carbonate at a temperature of from 900 to 1500° C. for 1 to 24 hours, and then cooling the resulting mixture.

The alkali metal compounds used in the production of the cullets include hydroxides, carbonates, sulfates, etc. of potassium or sodium. Examples include KOH, NaOH, $Na_2CO_3$, $K_2CO_3$, and $Na_2SO_4$. The amount of the alkali metal compounds added is determined by the compositions of the desired cullets.

The alkaline earth metal compounds used in the production of the cullets according to First Embodiment of the present invention include oxides, hydroxides, carbonates, chlorides, nitrates, sulfates, etc. of calcium or magnesium. Examples thereof include $CaCO_3$, $MgCO_3$, $Ca(OH)_2$, $Mg(OH)_2$, MgO, $CaCl_2.nH_2O$, $MgCl_2.nH_2O$, $MgCa(SO_4)_2.nH_2O$, $MgCa(NO_3)_4.nH_2O$, $Ca(NO_3)_2.nH_2O$, $Mg(NO_3)_2.nH_2O$, $CaSO_4.nH_2O$, and $MgSO_4.nH_2O$ (In each hydrate, n is usually a number of from 0 to 20.). In addition, the alkaline earth metal compounds may be in the form of double salts. For instance, dolomite, which is a double salt of $CaCO_3$ and $MgCO_3$, may be used. Just as in the case of the alkali metal compounds, the amount of the alkaline earth metal compounds added is determined by the compositions of the desired cullets.

Although the shapes and sizes of the cullets are not particularly limited, from the viewpoint of reactivity, the cullets preferably have an average particle size of from 2 to 9000 μm, more preferably from 10 to 1000 μm.

In the method of the present invention, the resulting crystalline, inorganic ion exchange material is obtainable by adding a particular amount of water, and then baking the resulting mixture. The reasons for the addition of water prior to baking are that the reactivity is enhanced, thereby accelerating crystallization.

The amount of water added is 1 to 85 parts by weight, preferably 2 to 50 parts by weight, more preferably 10 to 30 parts by weight, based on 100 parts by weight of the cullets in First Embodiment, and is 1 to 75 parts by weight, preferably 2 to 50 parts by weight, more preferably 10 to 30 parts by weight, based on 100 parts by weight of the cullets in Second Embodiment.

In both the First and Second Embodiments, when the amount of water exceeds the upper limits, a large amount of energy is required during baking. On the other hand, when the amount of water is less than the lower limits, the crystallization is less likely to progress during baking, thereby making it likely to lower the ion exchange properties.

The baking may be carried out in the present invention by any of the generally known methods, including a process comprising the steps of baking the starting materials at a temperature normally ranging from 300 to 1500° C., preferably from 500 to 1300° C., more preferably from 520 to 900° C., to crystallize the resulting product. When the baking temperature is less than 300° C., crystallization may be insufficient, with the result that the anti-solubility in water of the resulting inorganic ion exchange material is poor, and when the baking temperature exceeds 1500° C., coarse grains are likely to form, thereby decreasing the ion exchange capacity of the resulting inorganic ion exchange material. The baking time is normally 0.1 to 24 hours. Such baking can normally be carried out in a heating furnace, such as an electric furnace or a gas furnace. In certain cases, the cullets may be further subjected to a hydrothermal treatment before baking.

The baked product may be pulverized, where necessary, to a given granularity. The pulverization is achieved by using a ball mill, a roller mill or any other mechanical mills.

The inorganic ion exchange material of the present invention may be easily formed into a hydrate by any known method without limitation. For example, a hydrate of an inorganic ion exchange material can be obtained by suspending the anhydride of the above inorganic ion exchange material in ion-exchanged water to form a hydrate, which is then dried to yield a powder.

The crystalline, inorganic ion exchange material obtainable by the method of the present invention mentioned above has the following compositions for each of the embodiments.

First Embodiment

The material has the following composition:

$$xM_2O.ySiO_2.zMeO,$$

wherein x, y, and z are numerical values satisfying the relationships of y/x=0.5 to 2.1 and z/y=0.001 to 1.0; M stands for Na and K, wherein K/Na is in the range from 0.01 to 1.2; and Me stands for Ca and/or Mg.

Second Embodiment

The material has the following composition:

$$xM_2O.ySiO_2,$$

wherein x and y are numerical values satisfying the relationship of y/x=0.5 to 2.1; and M stands for Na and K, wherein K/Na is in the range from 0.01 to 1.2.

In the present invention, because of their structural stability in water, a preference is given to the materials having the above formulas wherein:

In First Embodiment, y/x=0.5 to 2.0, more preferably 1.0 to 2.0, z/y=0.005 to 0.5, and K/Na=0.01 to 0.9; and In Second Embodiment, y/x=0.5 to 2.0, more preferably 1.0 to 2.0, and K/Na=0.01 to 0.8.

Since the crystalline, inorganic ion exchange materials mentioned above have excellent ion exchange capacity, ion exchange speed, and alkaline capacity, they are highly useful as ion exchangers and alkalizers.

The present invention will be explained in detail below by the following Examples and Comparative Examples, without intending to limit the scope of the present invention thereto. Incidentally, Examples 1 to 12 correspond to First Embodiment, and Examples 13 to 20 correspond to Second Embodiment.

In the following Examples and Comparative Examples, the ion exchange property was evaluated by the following method. Specifically, a 0.04 g sample pulverized to a size of 0.045 mm-pass (average particle size: 10 ±2 μm; measured by a laser diffraction particle size analyzer, "LA-500," manufactured by Horiba, LTD.) was accurately weighed and added to 100 ml of a calcium chloride aqueous solution (100 ppm concentration, when calculated as $CaCO_3$), followed by stirring at 10° C. for one minute. Thereafter, the mixture was filtered using a membrane filter of 0.2 μm pore size. 10 ml of the filtrate was assayed for Ca content by an EDTA titration. In the evaluation for the ion exchange property, the values found were expressed in $CaCO_3$ mg/g.min in the following Examples and Comparative Examples.

Example 1

232.6 g of silica sand ("FLATTERYSAND" produced in Australia; $SiO_2$ purity: 99.8%) and reagents comprising 179.7 g of $Na_2CO_3$, 80.2 g of $K_2CO_3$, 6.19 g of $CaCO_3$, and 1.30 g of $MgCO_3$ were blended, and then the resulting mixture was fused in a platinum crucible at 1300° C. for 8 hours. Thereafter, the resulting mixture was rapidly quenched, to give cutlets.

The resulting fused cullets were pulverized to a size of 0.2 mm-pass, and then 18 parts by weight of ion-exchanged water were added and blended to 100 parts by weight of the pulverized product obtained above. Thereafter, the resulting mixture was baked in a nickel crucible using an electric furnace at 600° C. for 5 hours. After baking, the baked product was pulverized to a size of 0.045 mm-pass, to give powdered inorganic ion exchange material 1.

The ion exchange property of the resulting ion exchange material is shown in Table 2 together with the production conditions. Also, the obtained powdered inorganic ion exchange material gave excellent crystallinity as shown in an X-ray diffraction pattern illustrated in FIG. 1. In addition, it had excellent ion exchange property.

Examples 2 to 20

The same procedures as in Example 1 were carried out except for changing the starting material composition as listed in Table 1, and for changing the cullet composition, the fusing temperature, the baking temperature, and the water content added as listed in Table 2, to give each of powdered inorganic ion exchange materials 2 to 20. The ion exchange property of each of the resulting ion exchange materials is shown in Table 2 together with the production conditions. All of the resulting ion exchange materials gave excellent crystallinity and had excellent ion exchange properties.

Comparative Example 1

244.2 g of the silica sand (the same one used in Example 1), and reagents comprising 213.9 g of $Na_2CO_3$ and 41.8 g of $K_2CO_3$ were blended, and then the resulting mixture was fused in a platinum crucible at 1400° C. for 8 hours. Thereafter, the resulting mixture was rapidly quenched, to give fused cullets.

The resulting cullets were pulverized to a size of 0.2 mm-pass, and then the resulting pulverized cullets were immediately baked in a nickel crucible at 650° C. for 5 hours without adding water. After baking, the baked product was pulverized to a size of 0.045 mm-pass, to give powdered comparative ion exchange material 1.

The ion exchange property of the resulting ion exchange material is shown in Table 2 together with the production conditions. Although the resulting ion exchange material showed good crystallinity, it had notably poorer performance in ion exchange property when compared to those of powdered inorganic ion exchange materials 1 to 20.

Comparative Example 2

265.7 g of the silica sand (the same one used in Example 1) and 234.3 g of a reagent $Na_2CO_3$ were blended. The resulting mixture was fused in a platinum crucible at 1500° C. for 8 hours. Thereafter, the resulting mixture was rapidly quenched, to give fused cullets.

The cullets were pulverized to a size of 0.2 mm-pass, and 15 parts by weight of ion-exchanged water were added and blended to 100 parts by weight of the pulverized product obtained above. Thereafter, the resulting pulverized cullets were baked in a nickel crucible at 700° C. for 5 hours. After baking, the baked product was pulverized to a size of 0.045 mm-pass, to give powdered comparative ion exchange material 2.

The ion exchange property of the resulting ion exchange material is shown in Table 2 together with the production conditions. Although the resulting ion exchange material showed good crystallinity, it had notably poorer performance in ion exchange property when compared to those of powdered inorganic ion exchange materials 1 to 20.

Comparative Examples 3 to 5

The same procedures as in Comparative Example 1 were carried out except for changing the starting material composition as listed in Table 1, and for changing the cullet composition, the fusing temperature, and the baking temperature as listed in Table 2, to give each of powdered comparative inorganic ion exchange materials 3 to 5.

The ion exchange property of each of the resulting powdered comparative ion exchange materials is shown in Table 2 together with the production conditions. All of the comparative inorganic ion exchange materials had notably poorer performance in ion exchange property when compared to those of powdered inorganic ion exchange materials 1 to 20.

TABLE 1

| | Silica Sand (g) | Na Starting Material | (g) | K Starting Material | (g) | Ca Starting Material | (g) | Mg Starting Material | (g) |
|---|---|---|---|---|---|---|---|---|---|
| Example Nos. | | | | | | | | | |
| 1 | 232.6 | $Na_2CO_3$ | 179.7 | $K_2CO_3$ | 80.2 | $CaCO_3$ | 6.19 | $MgCO_3$ | 1.30 |
| 2 | 240.4 | $Na_2CO_3$ | 167.8 | $K_2CO_3$ | 88.2 | $CaCO_3$ | 1.20 | $MgCO_3$ | 2.36 |

TABLE 1-continued

|  | Silica Sand (g) | Na Starting Material | (g) | K Starting Material | (g) | Ca Starting Material | (g) | Mg Starting Material | (g) |
|---|---|---|---|---|---|---|---|---|---|
| 3 | 249.8 | Na$_2$CO$_3$ | 156.9 | KOH | 79.3 | CaCO$_3$ | 10.39 | Mg(OH)$_2$ | 3.63 |
| 4 | 277.3 | NaOH | 118.1 | KOH | 93.1 | CaCO$_3$ | 11.53 | — | — |
| 5 | 247.2 | NaOH | 166.5 | K$_2$CO$_3$ | 56.8 | CaCO$_3$ | 24.67 | Mg(OH)$_2$ | 4.79 |
| 6 | 252.0 | NaOH | 164.8 | K$_2$CO$_3$ | 46.3 | CaCO$_3$ | 10.48 | MgCO$_3$ | 26.50 |
| 7 | 218.3 | Na$_2$CO$_3$ | 192.6 | K$_2$CO$_3$ | 20.1 | Ca(OH)$_2$ | 53.73 | MgCO$_3$ | 15.30 |
| 8 | 215.9 | Na$_2$CO$_3$ | 104.9 | K$_2$CO$_3$ | 164.1 | — | — | MgCO$_3$ | 15.14 |
| 9 | 175.2 | Na$_2$CO$_3$ | 110.7 | K$_2$CO$_3$ | 115.5 | Ca(OH)$_2$ | 64.69 | Mg(OH)$_2$ | 33.97 |
| 10 | 154.0 | Na$_2$CO$_3$ | 135.7 | KOH | 86.2 | Ca(OH)$_2$ | 56.86 | Mg(OH)$_2$ | 67.20 |
| 11 | 127.7 | NaOH | 85.0 | KOH | 119.2 | Ca(OH)$_2$ | 78.60 | MgCO$_3$ | 89.54 |
| 12 | 129.9 | NaOH | 314.2 | K$_2$CO$_3$ | 54.3 | Ca(OH)$_2$ | 1.28 | MgCO$_3$ | 0.36 |
| 13 | 265.3 | Na$_2$CO$_3$ | 219.8 | KOH | 14.9 |  |  |  |  |
| 14 | 249.1 | Na$_2$CO$_3$ | 221.5 | K$_2$CO$_3$ | 29.4 |  |  |  |  |
| 15 | 240.4 | Na$_2$CO$_3$ | 215.6 | K$_2$CO$_3$ | 44.0 |  |  |  |  |
| 16 | 228.2 | Na$_2$CO$_3$ | 219.4 | K$_2$CO$_3$ | 52.4 |  |  |  |  |
| 17 | 220.1 | Na$_2$CO$_3$ | 231.0 | KOH | 48.9 |  |  |  |  |
| 18 | 268.5 | NaOH | 136.1 | KOH | 95.4 |  |  |  |  |
| 19 | 241.0 | Na$_2$CO$_3$ | 252.4 | K$_2$CO$_3$ | 6.6 |  |  |  |  |
| 20 | 252.4 | NaOH | 90.8 | K$_2$CO$_3$ | 156.8 |  |  |  |  |
| Comparative Example Nos. |  |  |  |  |  |  |  |  |  |
| 1 | 244.2 | Na$_2$CO$_3$ | 213.9 | K$_2$CO$_3$ | 41.8 | — | — | — | — |
| 2 | 265.7 | Na$_2$CO$_3$ | 234.3 | — | — | — | — | — | — |
| 3 | 239.9 | Na$_2$CO$_3$ | 256.3 | — | — | CaCO$_3$ | 2.79 | MgCO$_3$ | 1.01 |
| 4 | 273.1 | NaOH | 161.5 | KOH | 56.6 | CaCO$_3$ | 7.27 | MgCO$_3$ | 1.53 |
| 5 | 214.9 | Na$_2$CO$_3$ | 180.4 | K$_2$CO$_3$ | 94.1 | Ca(OH)$_2$ | 10.58 | — | — |

TABLE 2

|  | M$_2$O | | MeO | | Fusing Temp. (° C.) | Baking Temp. (° C.) | Added Amount Water (Parts by Wt.) | Ion Exchange Property (CaCO$_3$/ g · min) |
|---|---|---|---|---|---|---|---|---|
|  | y/x | K/Na | z/y Ca | Mg |  |  |  |  |
| Example Nos. |  |  |  |  |  |  |  |  |
| 1 | 1.70 | 0.342 | 0.020 0.016 | 0.004 | 1300 | 600 | 18 | 138 |
| 2 | 1.80 | 0.403 | 0.010 0.003 | 0.007 | 1300 | 600 | 15 | 146 |
| 3 | 1.90 | 0.478 | 0.040 0.025 | 0.015 | 1300 | 600 | 15 | 142 |
| 4 | 2.00 | 0.562 | 0.025 0.025 | 0 | 1300 | 580 | 15 | 145 |
| 5 | 1.65 | 0.198 | 0.080 0.060 | 0.020 | 1400 | 620 | 18 | 133 |
| 6 | 1.75 | 0.163 | 0.100 0.025 | 0.075 | 1400 | 650 | 18 | 124 |
| 7 | 1.85 | 0.080 | 0.250 0.200 | 0.050 | 1500 | 720 | 20 | 108 |
| 8 | 1.65 | 1.200 | 0.050 0 | 0.050 | 900 | 500 | 30 | 103 |
| 9 | 1.55 | 0.800 | 0.500 0.300 | 0.200 | 1000 | 600 | 35 | 107 |
| 10 | 1.25 | 0.600 | 0.750 0.300 | 0.450 | 900 | 500 | 50 | 104 |
| 11 | 1.00 | 1.000 | 1.000 0.500 | 0.500 | 1500 | 980 | 85 | 104 |
| 12 | 0.50 | 0.100 | 0.010 0.008 | 0.002 | 1300 | 900 | 2 | 108 |
| 13 | 2.00 | 0.064 |  |  | 1500 | 700 | 10 | 102 |
| 14 | 1.80 | 0.102 |  |  | 1500 | 680 | 10 | 105 |
| 15 | 1.70 | 0.157 |  |  | 1400 | 600 | 8 | 111 |
| 16 | 1.55 | 0.183 |  |  | 1400 | 550 | 14 | 116 |
| 17 | 1.40 | 0.200 |  |  | 1400 | 1000 | 2 | 125 |
| 18 | 1.75 | 0.500 |  |  | 1000 | 600 | 25 | 128 |
| 19 | 1.65 | 0.020 |  |  | 1500 | 1300 | 75 | 106 |
| 20 | 1.85 | 1.000 |  |  | 900 | 500 | 50 | 109 |
| Comparative Example Nos. |  |  |  |  |  |  |  |  |
| 1 | 1.75 | 0.150 | 0 0 | 0 | 1400 | 650 | 0 | 97 |
| 2 | 2.00 | 0 | 0 0 | 0 | 1500 | 700 | 15 | 87 |
| 3 | 1.65 | 0 | 0.010 0.007 | 0.003 | 1400 | 650 | 0 | 88 |
| 4 | 1.80 | 0.250 | 0.020 0.016 | 0.004 | 1500 | 450 | 0 | 68 |
| 5 | 1.50 | 0.400 | 0.040 0.940 | 0 | 1300 | 580 | 0 | 91 |

Notes from Table 2:
Composition: $xM_2O \cdot ySiO_2 \cdot zMeO$.
Water content: Amount of water expressed in parts by weight, based on 100 parts by weight of the cullets.

INDUSTRIAL APPLICABILITY

According to a method for producing a crystalline, inorganic ion exchange material of the present invention, the use of cullets which are easy to handle as starting materials enables the production of high-performance silicate ion exchange materials in a simple manner.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for producing a crystalline, inorganic ion exchange material comprising the steps of:

adding 10 to 30 parts by weight of water to 100 parts by weight of cullets, wherein the cullets have the following composition:

$$xM_2O.ySi)_2.zMeO,$$

wherein x, y, and z are numerical values satisfying the relationships of y/x=0.5 to 2.1, and z/y=0.001 to 1.0; M stands for Na and K, wherein K/Na is in the range from 0.01 to 1.2; and Me stands for Ca, Mg or both, and then baking the resulting mixture.

2. The method according to claim 1, wherein said cullets are prepared by fusing a mixture comprising silica sand, an alkali metal compound, and an alkaline earth metal compound at fusing temperature of from 900 to 1500° C., and the baking temperature after adding water to the cullets is from 500 to 1300° C.

3. The method according to claim 2, wherein said alkali metal compound is selected from the group consisting of potassium hydroxide, sodium hydroxide, potassium carbonate, sodium carbonate, potassium sulfate, and sodium sulfate.

4. The method according to claim 2, wherein said alkaline earth metal compound is selected from the group consisting of calcium oxide, magnesium oxide, calcium hydroxide, magnesium hydroxide, calcium carbonate, magnesium carbonate, calcium magnesium sulfate, calcium magnesium nitrate, calcium nitrate, magnesium nitrate, calcium chloride, magnesium chloride, calcium sulfate, and magnesium sulfate.

5. The method for producing a crystalline, inorganic ion exchange material according to claim 1, wherein y/x=0.5 to 2.0.

6. The method for producing a crystalline, inorganic ion exchange material according to claim 2, wherein the baking temperature is from 500 to 1300° C.

7. The method for producing a crystalline, inorganic ion exchange material according to claim 6, wherein the baking temperature is from 520 to 900° C.

8. The method for producing a crystalline, inorganic ion exchange material according to claim 1, wherein y/x=1.0 to 2.0.

9. The method for producing a crystalline, inorganic ion exchange material according to claim 1, wherein z/y=0.005 to 0.5.

10. The method for producing a crystalline, inorganic ion exchange material according to claim 1 wherein K/Na=0.01 to 0.9.

11. A method for producing a crystalline, inorganic ion exchange material comprising the steps of:

adding 10 to 25 parts by weight of water to 100 parts by weight of cullets, wherein the cullets have the following composition:

$$xM_2O.ySiO_2.zMeO,$$

wherein x, y, and z are numerical values satisfying the relationships of y/x=0.5 to 2.1, and z/y=0.001 to 1.0; M stands for Na and K, wherein K/Na is in the range from 0.01 to 1.2; and Me stands for Ca, Mg or both, and then baking the resulting mixture.

* * * * *